(12) United States Patent
Morita et al.

(10) Patent No.: US 10,233,917 B2
(45) Date of Patent: Mar. 19, 2019

(54) STRUCTURE FOR SECURING DIAPHRAGM, AND DIAPHRAGM PUMP AND VALVE DEVICE EQUIPPED WITH THE SAME

(71) Applicant: SUMITOMO RUBBER INDUSTRIES, LTD., Kobe-shi, Hyogo (JP)

(72) Inventors: Kouhei Morita, Kobe (JP); Takeshi Ishimaru, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 215 days.

(21) Appl. No.: 15/127,331

(22) PCT Filed: Jan. 14, 2015

(86) PCT No.: PCT/JP2015/050820
§ 371 (c)(1),
(2) Date: Sep. 19, 2016

(87) PCT Pub. No.: WO2015/141259
PCT Pub. Date: Sep. 24, 2015

(65) Prior Publication Data
US 2017/0122303 A1  May 4, 2017

(30) Foreign Application Priority Data
Mar. 20, 2014 (JP) .................. 2014-058751

(51) Int. Cl.
*F04B 45/04* (2006.01)
*F04B 43/02* (2006.01)
(Continued)

(52) U.S. Cl.
CPC .............. *F04B 45/04* (2013.01); *F04B 43/02* (2013.01); *F04B 43/06* (2013.01); *F04B 53/16* (2013.01);
(Continued)

(58) Field of Classification Search
CPC ...................................................... F04B 45/04
See application file for complete search history.

(56) References Cited

U.S. PATENT DOCUMENTS 1,640,606 A * 8/1927 Joyce .................. B60K 15/061
73/715
2,969,046 A * 1/1961 Kellogg ................ B60T 13/244
60/547.1
(Continued)

FOREIGN PATENT DOCUMENTS

EP  0071408 A1  2/1983
GB  492029 A  9/1938
(Continued)

OTHER PUBLICATIONS

Extended European Search Report for European Application No. 15765293.4, dated Nov. 30, 2017.
(Continued)

*Primary Examiner* — F Daniel Lopez
(74) *Attorney, Agent, or Firm* — Birch, Stewart, Kolasch & Birch, LLP

(57) ABSTRACT

By a securing structure 4, a diaphragm 3 dividing a space 20 into a first chest 21 and a second chest 22 is secured to a case 2 forming the space 20 therein. The case 2 has a first frame 5 having a first concave portion 50 for forming the first chest 21, and a second frame 6 having a second concave portion 60 for forming the second chest 22. The edge portion 32 of the diaphragm 3 is compressed and secured between the first frame 5 and the second frame 6 which are fitted with each (Continued)

other. The first frame 5 has a first securing portion 52 for retaining the second frame 6 upon the fitting so as not to come off.

7 Claims, 11 Drawing Sheets

(51) Int. Cl.
*F04B 43/06* (2006.01)
*F16K 31/10* (2006.01)
*F16K 31/06* (2006.01)
*F04B 53/16* (2006.01)
*F16K 27/02* (2006.01)

(52) U.S. Cl.
CPC ...... *F16K 27/0236* (2013.01); *F16K 31/0641* (2013.01); *F16K 31/10* (2013.01)

(56) References Cited

U.S. PATENT DOCUMENTS

| | | | | |
|---|---|---|---|---|
| 4,299,159 A | * | 11/1981 | Forster | G01L 7/102 92/98 R |
| 6,295,918 B1 | | 10/2001 | Simmons et al. | |
| 2002/0053651 A1 | | 5/2002 | Fukano et al. | |
| 2003/0209546 A1 | | 11/2003 | Wilhite | |
| 2005/0115402 A1 | | 6/2005 | Hembree | |

FOREIGN PATENT DOCUMENTS

| | | |
|---|---|---|
| JP | 47-31201 | 9/1972 |
| JP | 49-123444 | 10/1974 |
| JP | 58-165282 U | 11/1983 |
| JP | 60-122587 U | 8/1985 |
| JP | 2-69079 U | 5/1990 |
| JP | 4-89585 U | 8/1992 |
| JP | 11-183359 A | 7/1999 |
| JP | 2002-139161 A | 5/2002 |
| JP | 2003-175960 A | 6/2003 |
| JP | 2005-16415 A | 1/2005 |
| JP | 2007-515584 A | 6/2007 |
| JP | 2013-87680 A | 5/2013 |
| WO | WO 2013/074100 A1 | 5/2013 |

OTHER PUBLICATIONS

International Search Report for PCT/JP2015/050820 dated Mar. 24, 2015.
Written Opinion of the International Searching Authority for PCT/JP2015/050820 dated Mar. 24, 2015.

* cited by examiner

STRUCTURE FOR SECURING DIAPHRAGM, AND DIAPHRAGM PUMP AND VALVE DEVICE EQUIPPED WITH THE SAME

TECHNICAL FIELD

The present invention relates to a structure for securing a diaphragm which divides a space into a first chest and a second chest, to a case which forms the space therein, and a diaphragm pump and a valve device which are equipped with the same.

BACKGROUND ART

In various analyses such as chemical examination, environmental analyses and biotechnological research, a diaphragm pump and a valve device which are equipped with a diaphragm are employed in order to feed an accurate quantity of a fluid being treated.

For example, Patent document 1 discloses a diaphragm pump having a structure such that a diaphragm is secured between a pair of frames, wherein the frames are mutually-coupled by the use of pairs of screws and screw nuts in order to suppress a leakage of the fluid from an edge portion of the diaphragm.

PRIOR ART DOCUMENTS

Patent Document

Patent document 1: Japanese Patent Application Publication No. H11-183359

The leakage of the fluid is caused when the force of the paired frames pressing the diaphragm becomes insufficient locally or overall. Therefore, in the structure for securing the diaphragm, a large number of screws and nuts are used in order to press the diaphragm evenly by a sufficient force.

SUMMARY OF THE INVENTION

Problems to be Resolved by the Invention

In the structure for securing the diaphragm, however, the number of the parts increases. This becomes a limiting factor of cost-cutting of the diaphragm pump and the valve device. Further, the work of fastening the screws and the nuts is time-consuming, and forces the worker to bear the burden, and a man-hour required for assembling the diaphragm pump and the valve device is increased.

In view of the circumstances as described above, the present invention was made, and a primary object is to provide a structure for securing a diaphragm and others capable of achieving a cost-cutting by reducing the number of parts and making the assembling easy.

Means of Solving the Problems

The present invention is a structure for securing a diaphragm which divides a space into a first chest and a second chest, to a case which forms the space therein, characterized in that
the case has a first frame having a first concave portion defining the first chest, and a second frame having a second concave portion defining the second chest,
an edge portion of the diaphragm is compressed and held between the first frame and the second frame which are fitted with each other, and
the first frame has first securing portions for holding the second frame in a retained state upon the fitting.

The securing structure according to the present invention, it is desirable that
the first frame has a first frame main body opposed to the second frame, and
the first securing portion comprises
a first protruding piece being elastically deformable and extending toward the second frame from an outer edge of the first frame main body, and
a first pawl provided in an end portion of the first protruding piece to be engaged with the second frame.

In the securing structure according to the present invention, it is desirable that the second frame has second securing portions for holding the first frame in a retained state upon the fitting.

In the securing structure according to the present invention, it is desirable that
the second frame has a second frame main body opposed to the first frame, and
the second securing portion comprises
a second protruding piece being elastically deformable and extending toward the first frame from an outer edge of the second frame main body, and
a second pawl provided in an end portion of the second protruding piece to be engaged with the first frame.

In the securing structure according to the present invention, it is desirable that the first securing portions and the second securing portions are disposed alternately along an outer circumference of the case.

In the securing structure according to the present invention, it is desirable that the first securing portions and the second securing portions are provided continuously along the outer circumference of the case.

In the securing structure according to the present invention, it is desirable that the edge portion of the diaphragm is provided with a thick part having a larger thickness.

In the securing structure according to the present invention, it is desirable that the first frame and/or the second frame is provided with a positioning groove in which the thick part is disposed.

The present invention is a diaphragm pump having the securing structure characterized in that
the first frame is provided with a first port communicating with the first chest,
the second frame is provided with a second port communicating with the second chest,
a fluid for driving the diaphragm is fed to the first chest via the first port, and
a fluid being treated flows into and flows out of the second chest via the second port.

The present invention is a valve device having the securing structure characterized in that
the first chest of the first frame is provided with a driving means for driving the diaphragm,
the second frame has an inflow port for allowing the fluid to flow into the second chest, and an outflow port for allowing the fluid to flow out of the second chest,
the outflow port has an opening around which a valve seat is formed, and
the diaphragm sits on and leaves the valve seat to close and open the outflow port.

Effect of the Invention

The present invention is the structure for securing the diaphragm which divides the space into the first chest and the second chest, to the case which forms the space therein, and the case has the first frame having the first concave portion defining the first chest, and the second frame having the second concave portion defining the second chest.

The edge portion of the diaphragm is compressed and held between the first frame and the second frame which are fitted with each other. Thereby, the leakage of the fluid being treated from the edge portion of the diaphragm is suppressed.

Since the first frame has the first securing portions for holding the second frame in the retained state upon the fitting, the first frame and the second frame are fitted with each other without fastening screws and screw nuts. Therefore, it becomes possible to achieve a cost-cutting by reducing the number of parts of the structure for securing a diaphragm and making the assembling easy.

According to the present invention, the diaphragm pump has the structure for securing a diaphragm wherein the fluid for driving the diaphragm is fed to the first chest of the first frame via the first port, and the fluid being treated flows in and flows out of the second chest via the second port. Thereby, although the diaphragm pump has the simple and inexpensive structure, it is possible to feed an accurate quantity of the fluid being treated.

According to the present invention, the valve device has the structure for securing a diaphragm, wherein the first chest of the first frame is provided with the driving means for driving the diaphragm, and the second frame has the inflow port for flowing the fluid into the second chest, and the outflow port for flowing the fluid out of the second chest.

The outflow port has the opening around which the valve seat is formed, and the diaphragm sits on and leaves the valve seat to close and open the outflow port. Thereby, although the valve device has the simple and inexpensive structure, it is possible to feed an accurate quantity of the fluid being treated.

MODE FOR CARRYING OUT THE INVENTION

Embodiments of the present invention will be described hereunder in conjunction with drawings.

(First Embodiment)

Figure 1:
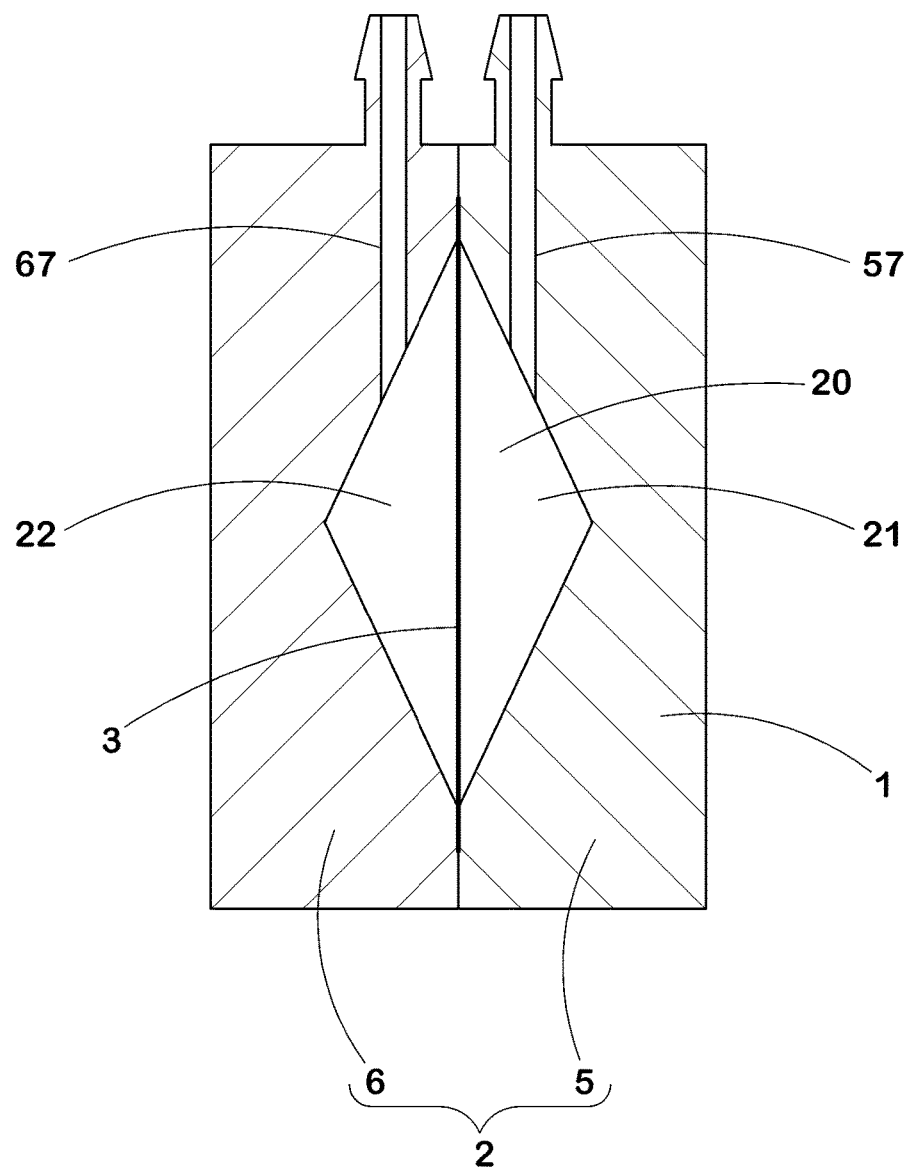
FIG. 1 A diagram showing explaining a part of the structure of an analyzing device equipped with a diaphragm pump as an embodiment of the present invention.

FIG. 1 shows a general structure of a diaphragm pump 1 as a first embodiment of the present invention.

The diaphragm pump 1 is to feed a fluid being treated such as test sample at a constant quantity.

The diaphragm pump 1 has a case 2 forming a space 20 therein, and a diaphragm 3 dividing the space 20 into a first chest 21 and a second chest 22.

By filling up the first chest 21 with a fluid such as gas and discharging the fluid, the fluid being treated is fed from the second chest 22.

Namely, by the gas filling up the first chest 21 and discharged therefrom, the diaphragm 3 is driven and transformed, and the fluid is fed from the second chest 22 at a constant quantity.

The volume of the discharged fluid is determined by the volume of the space 20, the volume of the diaphragm 3 occupying the space 20 and the like.

Figure 2:
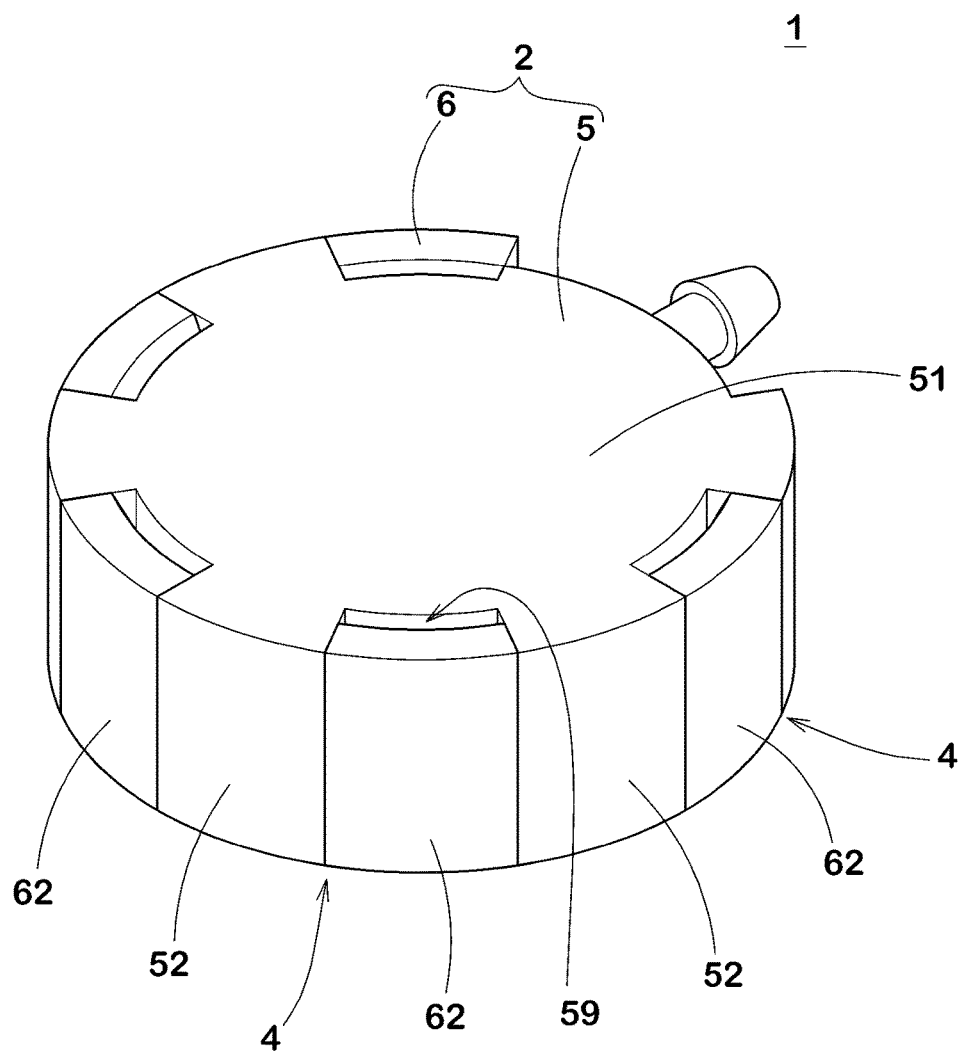
FIG. 2 A perspective view of the diaphragm pump shown in FIG. 1.
Figure 3:
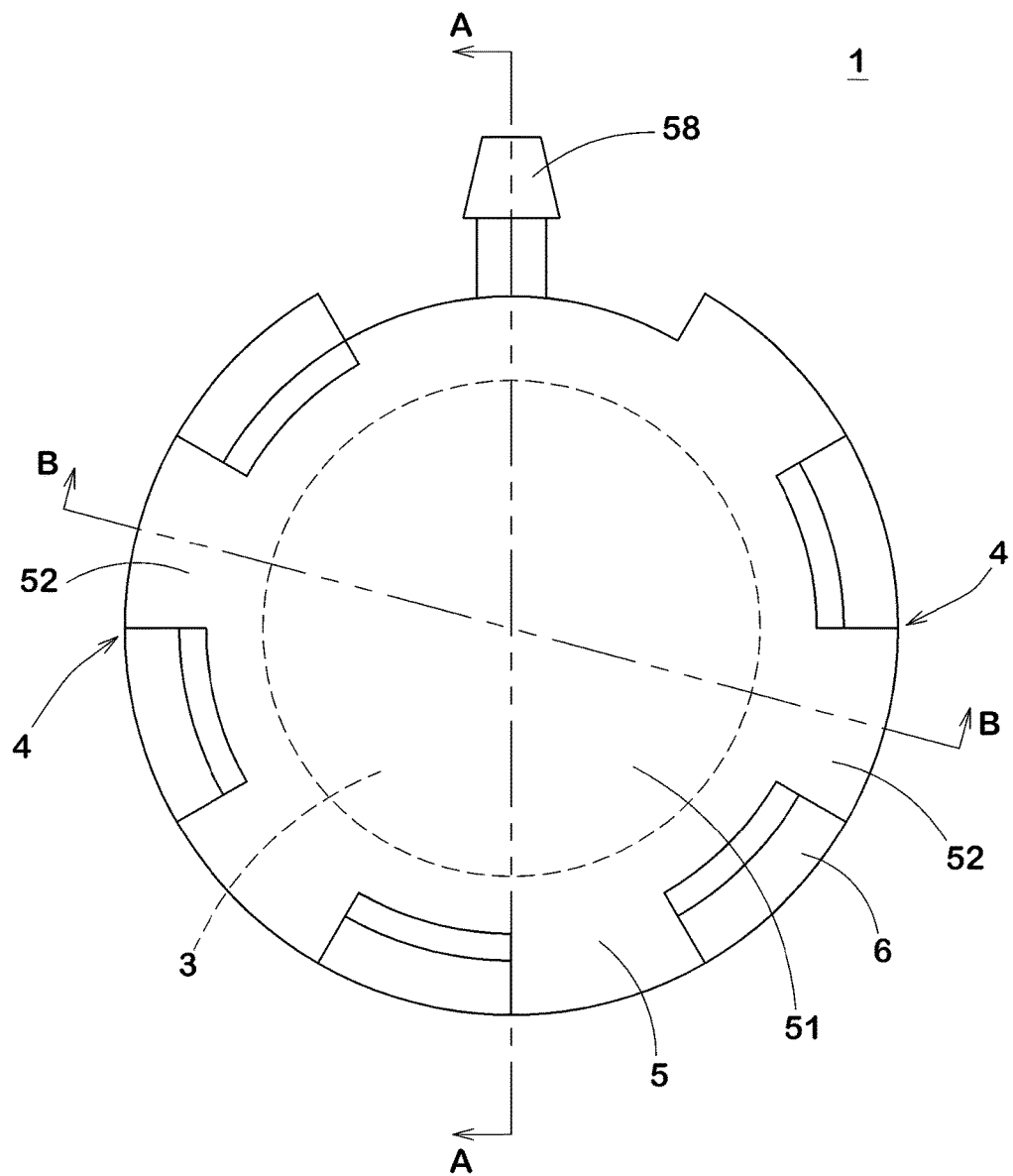
FIG. 3 A plan view of the diaphragm pump shown in FIG. 2.

In FIGS. 2 and 3, the external appearance of the diaphragm pump 1 is shown.

Figure 4:
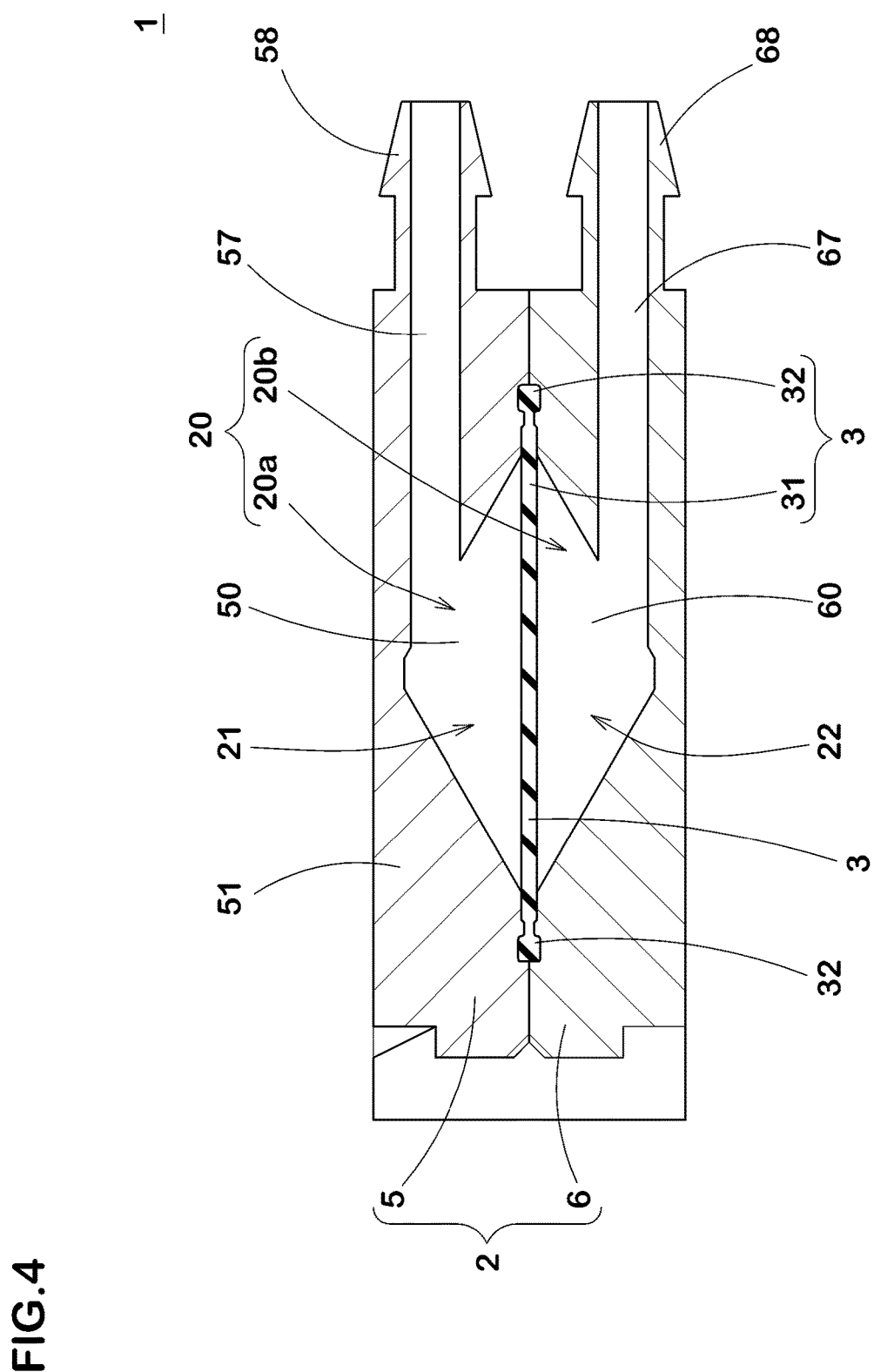
FIG. 4 A cross sectional view of the diaphragm shown in FIG. 3 taken along line A-A.
Figure 5:
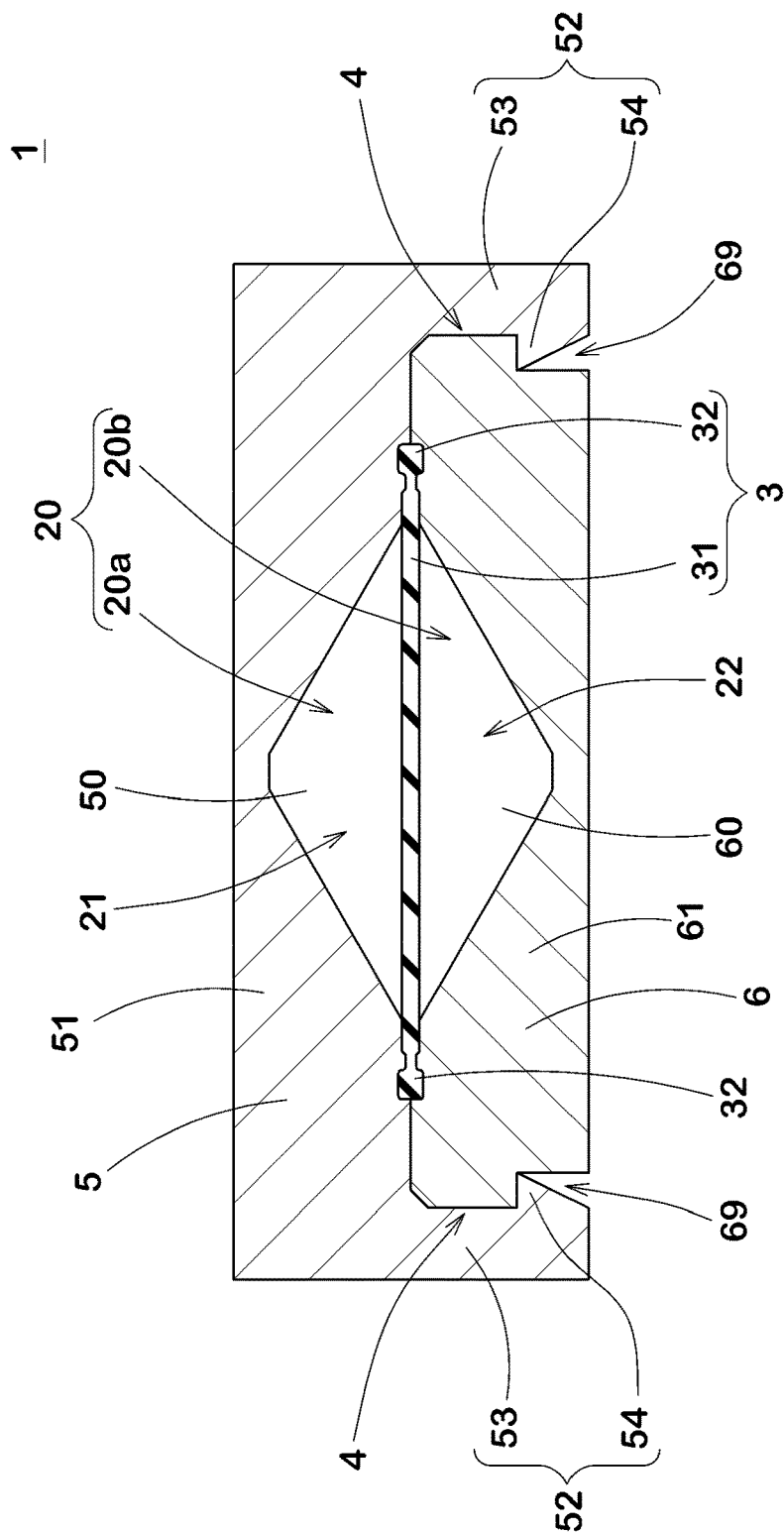
FIG. 5 A cross sectional view of the diaphragm shown in FIG. 3 taken along line B-B.

In FIG. 4 and FIG. 5, there are shown the A-A line section and B-B line section of the diaphragm pump 1 shown in FIG. 3.

Figure 6:
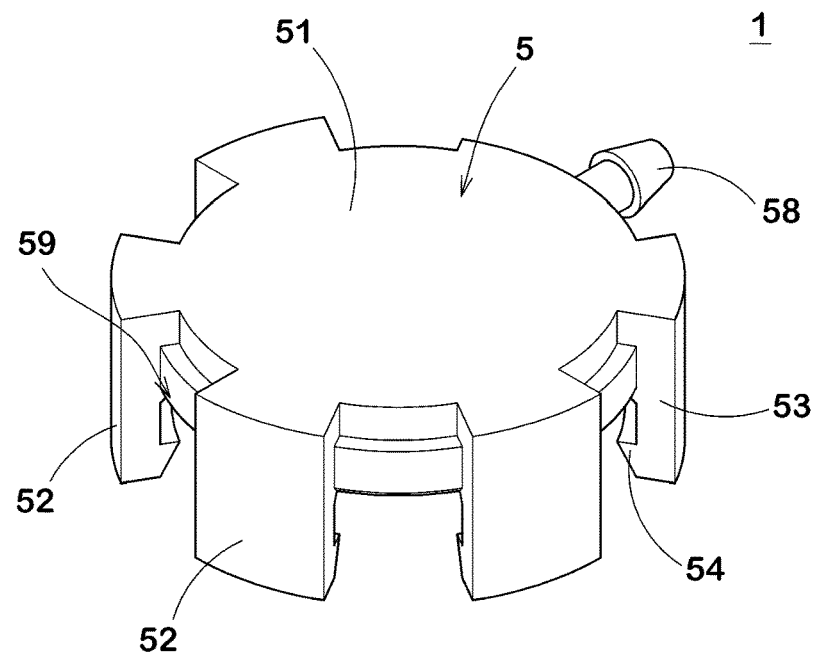
FIG. 6 An assembling perspective diagram of the diaphragm pump shown in FIG. 2.
Figure 6:
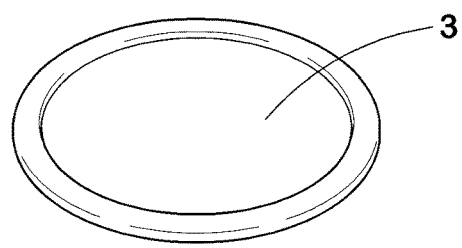
Figure 6:
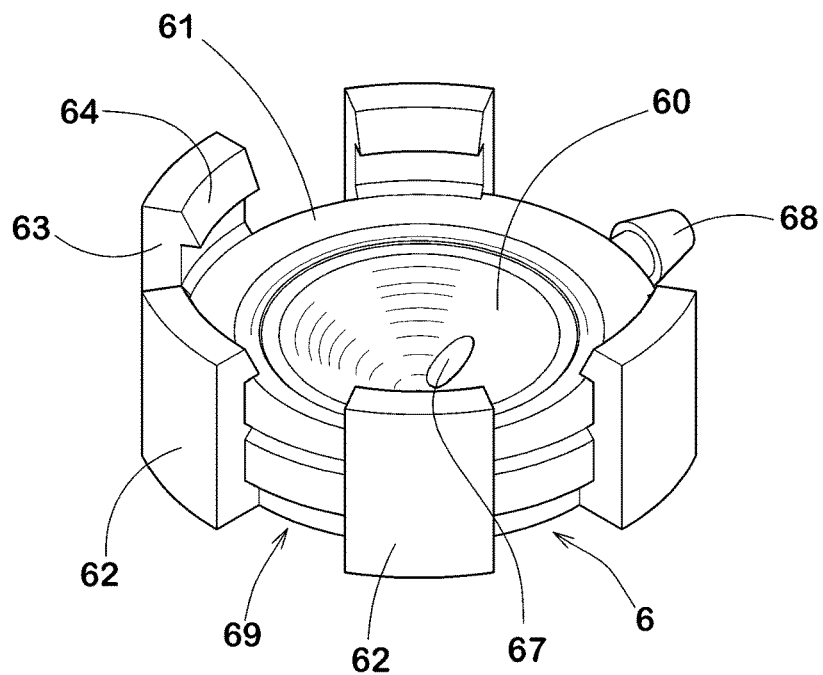

In FIG. 6, there is shown an assembly perspective diagram of the diaphragm pump 1.

The diaphragm 3 is secured to the case 2 by a securing structure 4.

The case 2 of the diaphragm pump 1 has a first frame 5 having a first concave portion 50 and a second frame 6 having a second concave portion 60.

The first concave portion 50 forms a space 20a on the first chest 21 side. The second concave portion 60 forms a space 20b on the second chest 22 side. The first concave portion 50 is opposed to the second concave portion 60.

The first concave portion 50 and the second concave portion 60 are formed in the form of an earthenware mortar.

The materials of the first frame 5 and the second frame 6 are determined in consideration of chemical resistance and the like. For example, PP(polypropylene), POM(polyacetal), PEEK(polyether ether ketone), PPS(polyphenylene sulfide), PTFE(polytetrafluoroethylene) or the like is used.

In this embodiment, since the first frame 5 and the second frame 6 are mechanically united by fitting without using adhesive, materials of poor adhesiveness can be used, and the freedom of choice of material is increased.

As shown in FIGS. 4 and 5, the diaphragm 3 has a membrane portion 31 dividing the space 20 into the first chest 21 and the second chest 22, and an edge portion 32 formed at the outer peripheral edge of the membrane portion 31.

The edge portion 32 is secured between the first frame 5 and the second frame 6.

By the elastic deformation of the membrane portion 31, the first chest 21 and the second chest 22 are alternately increased and decreased in their volumes.

The edge portion 32 of the diaphragm 3 is compressed and held between the first frame 5 and the second frame 6 which are fitted with each other. Thereby, the fluid being treated is suppressed from leaking from the edge portion 32 of the diaphragm 3.

The diaphragm 3 is formed from an elastic material which comprises, as the rubber component, at least one of Ethylene Propylene Diene (EPDM), fluoro rubber (FKM, FPM, FFKM), hydrogenated nitrile rubber (HNBR), butylene rubber (IIR) and silicone rubber(VMQ) for example.

If a rubber material including double bonds in its polymer main chain is used, there is a possibility that, during longtime use, the polymer main chain is broken, and it becomes impossible to maintain the durability of the diaphragm 3.

In particular, Ethylene Propylene Diene (EPDM) is preferred as the rubber component from the point of view of gas barrier, heat resistance, chemical resistance and production cost.

Figure 7:
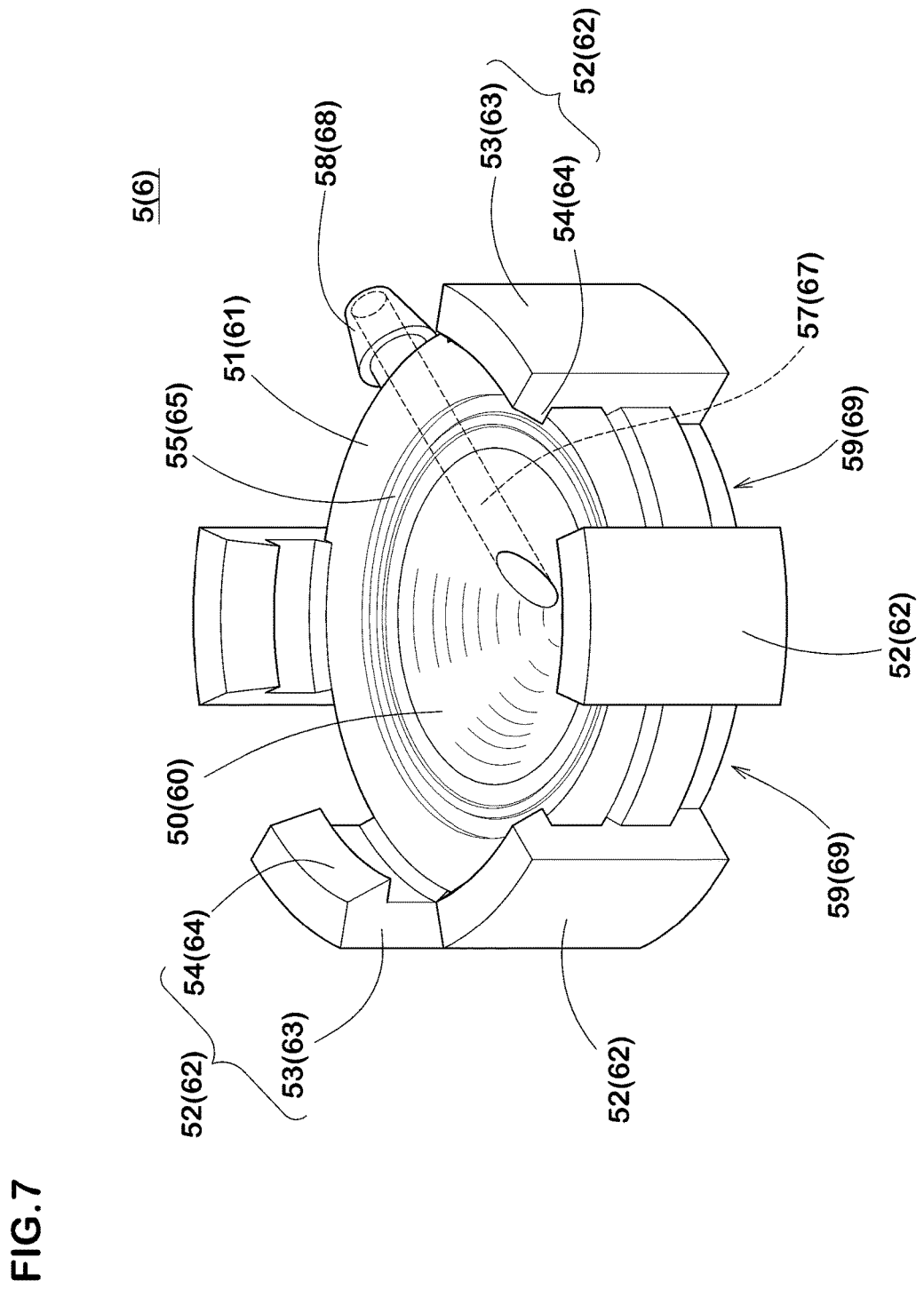
FIG. 7 A perspective view of the first or second case shown in FIG. 6.

FIG. 7 shows the first frame 5.

As shown in FIGS. 2, 3, 5, 7 etc., the first frame 5 has the first concave portion 50, a first frame main body 51 opposed to the second frame 6, first securing portions 52 for holding the second frame 6 in a retained state.

The first concave portion 50 is formed in an inner end face of the first frame main body 51 which face is opposed to the second frame 6 across the diaphragm.

The first frame main body 51 is generally column-shaped.

The first securing portions 52 are disposed intermittently along the outer edge of the first frame main body 51.

When the first frame 5 and the second frame 6 are fitted with each other, by the frictional force occurring between the first securing portions 52 and the second frame 6, the first frame 5 and the second frame 6 are strongly fitted with each other and united. Therefore, the leakage of the fluid being treated from the edge portion 32 of the diaphragm 3 is suppressed.

In this embodiment, as shown in FIGS. 5 and 7, the first securing portion 52 has a first protruding piece 53 extending toward the second frame 6 from an outer edge of the first frame main body 51, and a first pawl 54 provided in an end portion of the first protruding piece 53.

The first protruding piece 53 is formed as an elastically deformable arm.

The first pawl 54 protrudes inwardly of the second frame 6 and engages with the second frame 6.

When the first pawl 54 engages with the second frame 6, the elastically deformed first protruding piece 53 generates an elastomeric force, and the fitting between the first frame 5 and the second frame 6 becomes strong, therefore, the leakage of the fluid being treated from the edge portion 32 of the diaphragm 3 is further suppressed.

As shown in FIGS. 4 and 7, the first frame 5 is provided with a first port 57 communicating with the first chest 21. The tip end portion of the first port 57 is provided with a nipple 58 for connecting a pipe (not shown).

Through the first port 57 and the pipe, gas for driving the diaphragm 3 flows in and flows out of the first chest 21.

Incidentally, the first securing portions 52 are disposed not to interfere the nipple 58.

In this embodiment, the first port 57 extends along the end face of the column-shaped first frame 5 and communicates with the nipple 58 formed on the side surface. But, the first port 57 may be configured so as to extend toward the end face of the column-shaped first frame 5. In this case, the nipple 58 is formed on the end face of the first frame 5.

In this embodiment, the first frame 5 and the second frame 6 are formed in the identical shape as shown in FIGS. 6 and 7. Accordingly, the first frame 5 and the second frame 6 can be manufactured by the use of the same mold, and the production cost of the diaphragm pump 1 can be reduced.

The second frame 6 has a second frame main body 61 opposed to the first frame 5, and second securing portions 62 for holding the first frame 5 in a retained state.

The second concave portion 60 is formed in an inner end face of the second frame main body 61 which face is opposed to the first frame 5.

The second frame main body 61 is generally column-shaped.

The second securing portions 62 are disposed intermittently along the outer edge of the second frame main body 61.

When the first frame 5 and the second frame 6 are fitted with each other, by the frictional force occurring between the second securing portions 62 and the first frame 5, the first frame 5 and the second frame 6 are more strongly fitted with each other and united. Therefore, the leakage of the fluid being treated from the edge portion 32 of the diaphragm 3 is further suppressed.

In this embodiment, as shown in FIGS. 5 and 7, the second securing portions 62 has a second protruding piece 63 extending toward the first frame 5 from an outer edge of the first frame main body 61, and a second pawl 64 provided in an end portion of the second protruding piece 63.

The second protruding piece 63 is formed as an elastically deformable arm.

The second pawl 64 protrudes inwardly of the first frame 5 and engages with the first frame 5.

When the second pawl 64 engages with the first frame 5, the elastically deformed second protruding piece 63 generates an elastomeric force, and the fitting between the first frame 5 and the second frame 6 becomes strong, therefore, the leakage of the fluid being treated from the edge portion 32 of the diaphragm 3 is further suppressed.

As shown in FIGS. 4 and 7, the second frame 6 is provided with a second port 67 communicating with the second chest 22. The tip end portion of the second port 67 is provided with a nipple 68 for connecting a pipe (not shown).

Through the port 67 and the pipe, the fluid being treated flows in and flows out of the second chest 22.

Incidentally, the second securing portions 62 are provided not to interfere the nipple 68.

The first frame 5 and the second frame 6 are fitted with each other so that the nipple 58 overlaps the nipple 68 in a plan view.

In this embodiment, the second port 67 extends along the end face of the column-shaped second frame 6 and communicates with the nipple 68 formed on the side surface. But, the second port 67 may be configured so as to extend toward the end face of the column-shaped second frame 6. In this case, the nipple 68 is formed on the end face of the second frame 6.

As shown in FIGS. 2 and 6, the first securing portions 52 and the second securing portions 62 are alternately disposed along the outer circumference of the case 2. Thereby, it becomes possible to evenly compress the edge portion 32 of the diaphragm 3, and the leakage of the fluid being treated from the edge portion 32 of the diaphragm 3 is further suppressed.

Further, in this embodiment, the first securing portions 52 and the second securing portions 62 are continuously provided along the outer circumference of the case 2. Thereby, it becomes possible to evenly compress the edge portion 32 of the diaphragm 3 with sufficient strength, and the leakage of the fluid being treated from the edge portion 32 of the diaphragm 3 is further suppressed.

As shown in FIGS. 6 and 7, between the adjacent first securing portions 52 of the first frame 5, third concave portions 59 are formed. The third concave portion 59 is formed in a stepped shape complementary with the shape of the second protruding piece 63 and the second pawl 64 of the second frame 6. The third concave portions 59 and the second securing portions 62 of the second frame 6 are fitted with each other.

By the fitting, the second frame 6 is held in the retained state. Thereby, the first frame 5 and the second frame 6 are fitted with each other and united, without fastening screws and screw nuts. Therefore, it becomes possible to achieve a cost-cutting by reducing the number of parts of the securing structure 4 for the diaphragm 3 and making the assembling easy. Further, it becomes possible to make the structure of the diaphragm pump 1 simple and inexpensive.

Between the adjacent second securing portions 62 of the second frame 6, on the other hand, fourth concave portions 69 are provided. The fourth concave portion 69 is formed in a stepped shape complementary with the shape of the first protruding piece 53 and the first pawl 54 of the first frame 5. The fourth concave portions 69 fit with the first securing portions 52 of the first frame 5.

By the fitting, the first frame 5 is held in the retained state. Thereby, the first frame 5 and the second frame 6 are more strongly fitted with each other and united. Therefore, the leakage of the fluid being treated from the edge portion 32 of the diaphragm 3 is further suppressed.

Figure 8:
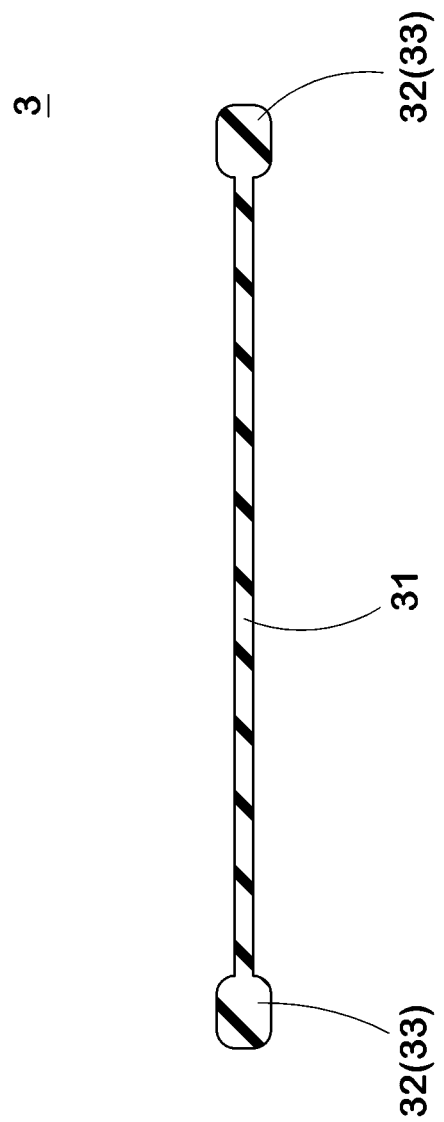
FIG. 8 A cross sectional view of the diaphragm shown in FIG. 6.

FIG. 8 shows the A-A line section of the diaphragm 3. The edge portion 32 of the diaphragm 3 is continuously provided with a thick part 33 whose thickness is more than that of the membrane portion 31. Thereby, the first frame 5 and the second frame 6 can hold the diaphragm 3 by exerting enough pressure to the thick part 33 while securing sufficient durability for the diaphragm 3, and the leakage of the fluid being treated from the edge portion 32 of the diaphragm 3 is further suppressed.

As shown in FIG. 7, the first frame 5 is provided with a groove 55 in which the thick part 33 fits.

Similarly, the second frame 6 is provided with a groove 65 in which the thick part 33 fits.

The total of the depths of the groove 55 and the groove 65 is set to be smaller than the thickness of the thick part 33.

By the grooves 55 and 65, the thick part 33 is moderately compressed, and the leakage of the fluid being treated from the edge portion 32 of the diaphragm 3 is further suppressed. Further, the grooves 55 and 65 function as a positioning groove when the diaphragm 3 is installed in the inside of first frame 5 and the second frame 6, and the manufacturing efficiency of the diaphragm pump 1 is improved.

(Second Embodiment)

Figure 9:
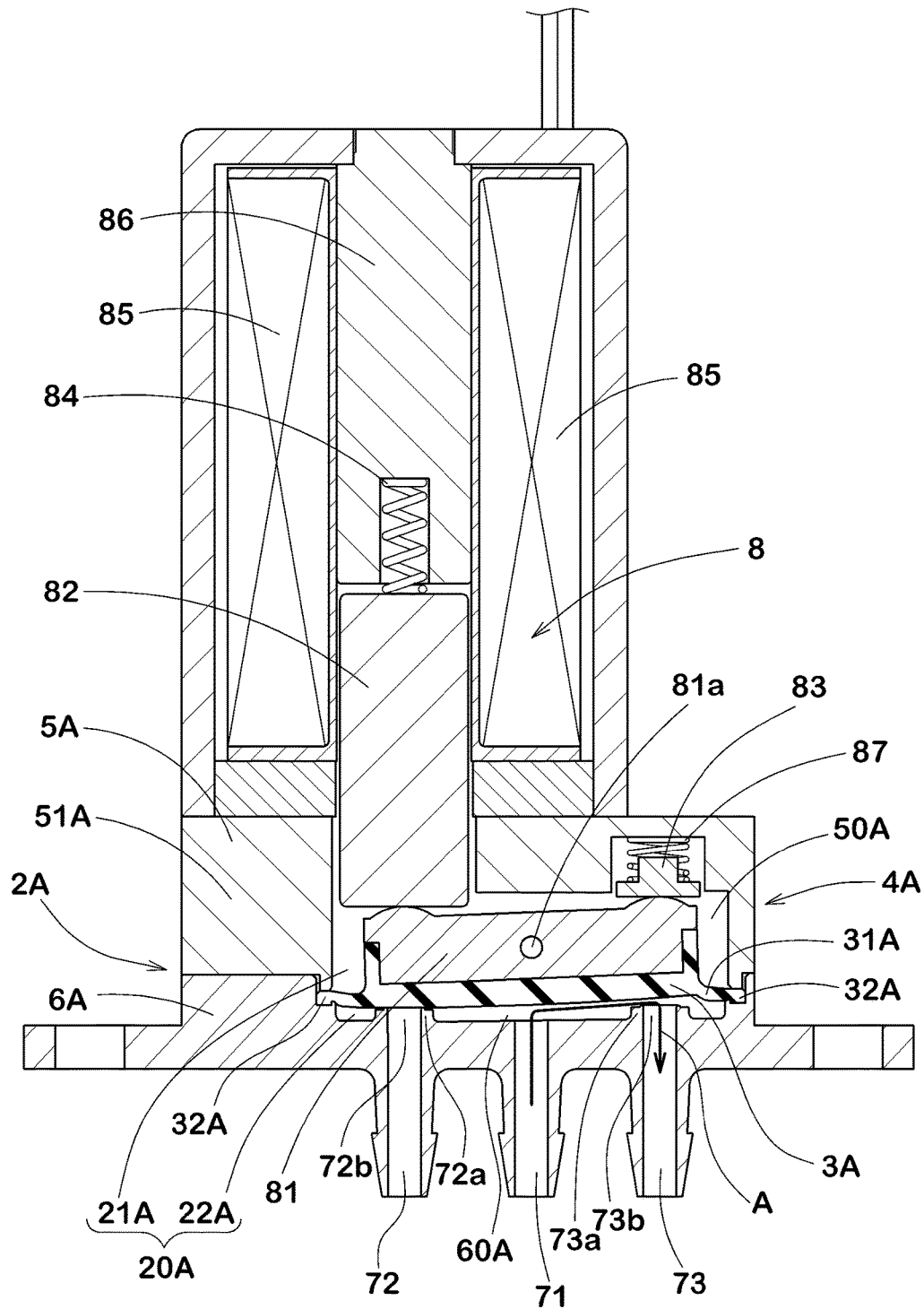
FIG. 9 A cross sectional view showing the structure of a valve device as another embodiment of the present invention.

FIG. 9 shows a valve device as a second embodiment of the present invention.

The valve device 7 has a case 2A forming a space 20A therein, and a diaphragm 3A dividing the space 20A into a first chest 21A and a second chest 22A.

The diaphragm 3A is secured to the case 2A by a securing structure 4A.

The case 2A has a first frame 5A having a first concave portion 50A, and a second frame 6A having a second concave portion 60A.

The first concave portion 50A forms a space 20A on the first chest 21A side.

The second concave portion 60A forms a space 20A on the second chest 22A side.

The diaphragm 3A has a membrane portion 31A dividing the space 20A into the first chest 21A and the second chest 22A, and an edge portion 32A formed at the outer peripheral edge of the membrane portion 31A. The edge portion 32A is secured between the first frame 5A and the second frame 6A.

By the elastic deformation of the membrane portion 31A, the diaphragm 3A can make oscillating movements.

The edge portion 32A of the diaphragm 3A is compressed and held between the first frame 5A and the second frame 6A which are fitted with each other. Thereby, the leakage of the fluid being treated from the edge portion 32A of the diaphragm 3A is suppressed.

The materials of the first frame 5A and the second frame 6A are the same as those of the first frame 5 and the second frame 6 in the first embodiment. The material of the diaphragm 3A is the same as that of the diaphragm 3 in the first embodiment.

The first concave portion 50A of the first frame 5A, namely, the first chest 21A is provided with a driving means 8 for driving the diaphragm 3A.

The diaphragm 3A is oscillated by being driven by the driving means 8.

The driving means 8 has an oscillating member 81 oscillating integrally with the diaphragm 3A, a first plunger (moving core) 82 for pressing one end of the oscillating member 81, a second plunger 83 for pressing the other end of the oscillating member 81 and the like.

The oscillating member 81 is housed in the space 20A.

The oscillating member 81 is freely turnably supported by the shaft member 81a. Both ends of the shaft member 81a are supposed by the first frame 5A.

The first plunger 82 is driven by a first coiled spring 84, a solenoidal coil 85 and a fixed iron core 86, and transmits its driving force to the oscillating member 81.

The second plunger 83 is driven by a second coiled spring 87, and transmits its driving force to the oscillating member 81.

The spring load of the first coiled spring 84 is set to be more than the spring load of the second coiled spring 87.

The oscillating member 81 and the diaphragm 3A receive the driving force transmitted by the first plunger 82 and the second plunger 83, and they are turned around the shaft member 81a like a seesaw.

The second frame 6A has an inflow port (Common port) 71 for flowing the fluid into the second chest 22A, and a NC (Normally close) outflow port 72 and NO (Normally open) outflow port 73 for flowing the fluid out of the second chest 22A.

The NC outflow port 72 has an opening 72b around which a valve seat 72a is formed. The diaphragm 3A sits on and leaves the valve seat 72a to close and open the NC outflow port 72.

The NO outflow port 73 has an opening 73b around which a valve seat 73a is formed. The diaphragm 3A sits on and leaves the valve seat 73a to close and open the NO outflow port 73.

By the turning of the oscillating member 81, either one of the NC outflow port 72 and the NO outflow port 73 is closed, and the other is opened. Thereby, the ports are alternately opened and closed.

In this embodiment, the valve device 7 is so called electromagnetic valve to switch the flow paths such that the diaphragm 3A is actuated by the electromagnetic force caused by the solenoidal coil 85 of the driving means 8 to open and close the NC outflow port 72 and the NO outflow port 73.

Hereinafter, the opening-closing action of the valve device 7 will be described.

The inflow port 71 is always opened, and the fluid is fed into the second chest 22A via the inflow port 71.

As previously mentioned, since the spring load of the first coiled spring 84 is larger than the spring load of the second coiled spring 87, an elastomeric force generated by the first coiled spring 84 is larger than an elastomeric force generated by the second coiled spring 87.

At normal times, therefore, as shown in FIG. 9, the oscillating member 81 and the diaphragm 3A maintain such a posture that they are turned counterclockwise in the figure, wherein the NC outflow port 72 is closed, and the NO outflow port 73 is opened. Thereby, the fluid flowing into the second chest 22A from the inflow port 71 is discharged from the NO outflow port 73 as indicated by arrow (A).

Figure 10:
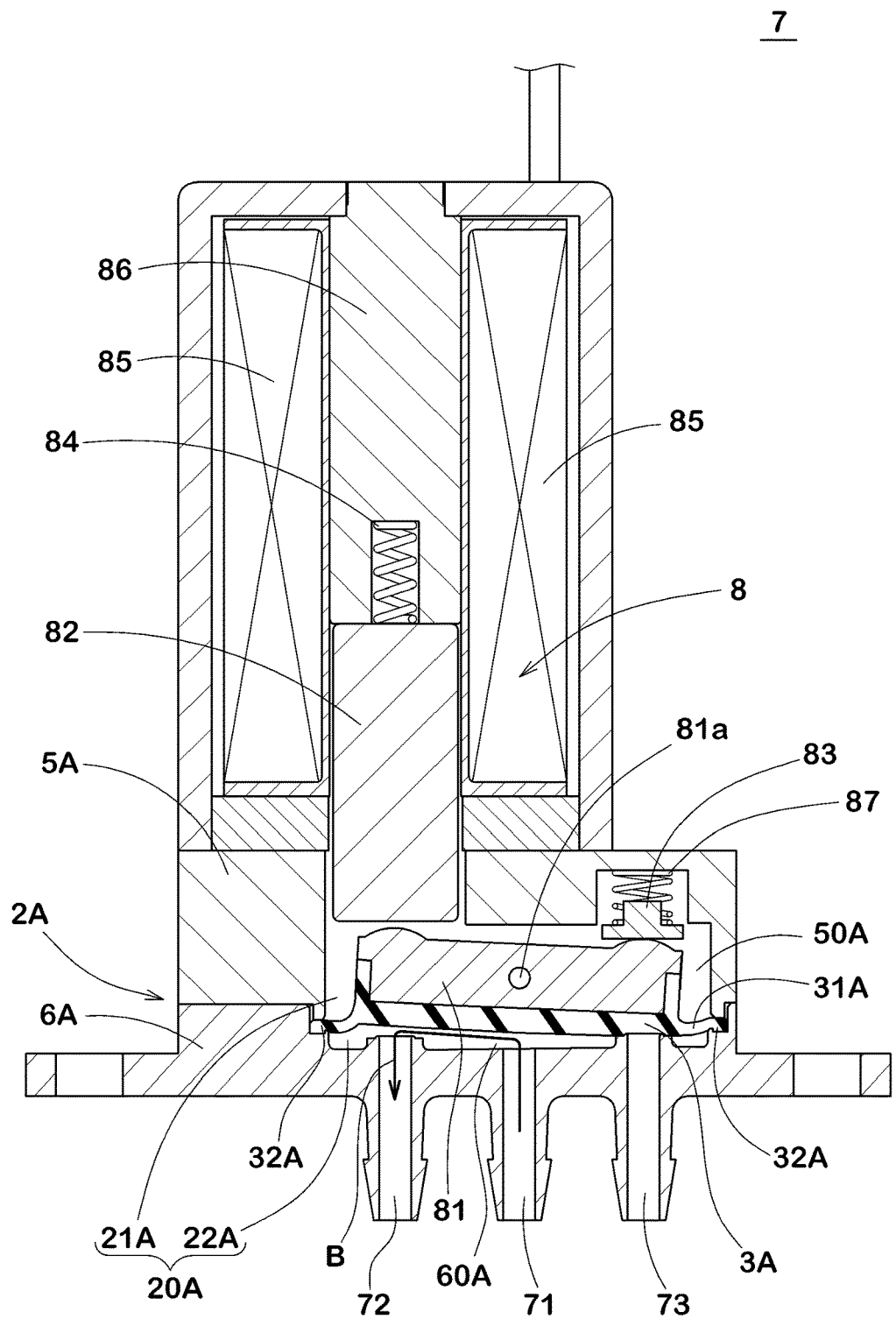
FIG. 10 A cross sectional view showing a state of the valve device shown in FIG. 9 in which the solenoidal coil is energized.

FIG. 10 shows the valve device 7 in a state such that the solenoidal coil 85 is energized.

When a predetermined electric current flows through the solenoidal coil 85, the electromagnetic force thereof moves the first plunger 82 toward a direction to compress the first coiled spring 84.

At this moment, the second plunger 83 presses the oscillating member 81, therefore, the oscillating member 81 and the diaphragm 3A are turned clockwise, and the NO outflow port 73 is closed, and the NC outflow port 72 is opened. Thereby, as indicated by arrow B, the fluid flowing into the second chest 22A from the inflow port 71 is discharged from the NC outflow port 72.

Figure 11:
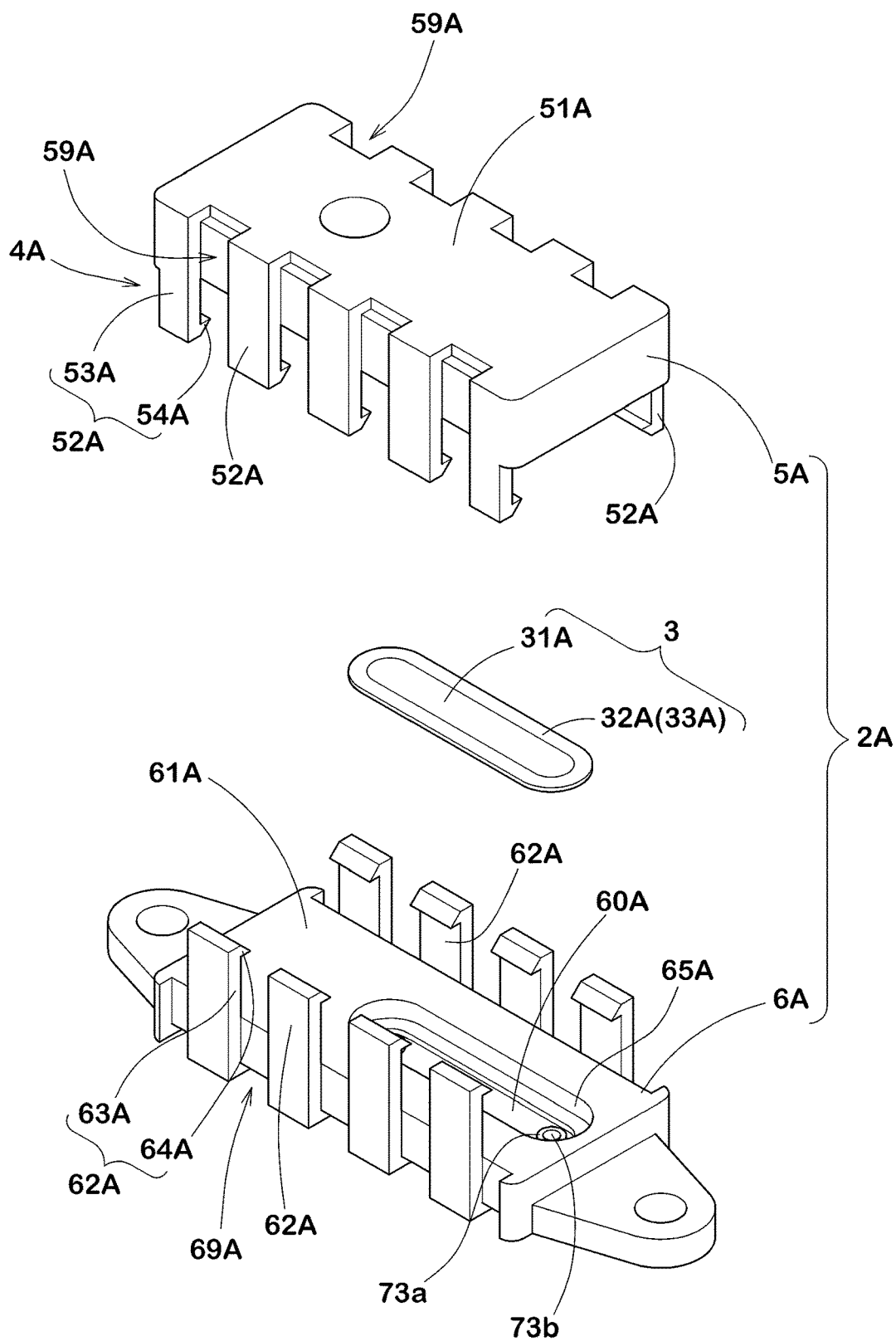
FIG. 11 An assembling perspective diagram of the case shown in FIG. 9.

FIG. 11 is a perspective view of the case 2A which the valve device 7 is equipped with.

The first frame 5A has the first concave portion 50A, a first frame main body 51A opposed to the second frame 6A, and first arm portions 52A for holding the second frame 6 in a retained state.

As shown in FIG. 9, the first concave portion 50A is formed in an inner end face of the first frame main body 51A which face is opposed to the second frame 6A.

The first arm portions 52A are disposed along an outer edge of the first frame main body 51A.

When the first frame 5A and the second frame 6A are fitted with each other, by the frictional force occurring between the first securing portions 52A and the second frame 6A, the first frame 5A and the second frame 6A are strongly fitted with each other and united. Therefore, the leakage of the fluid being treated from the edge portion 32A of the diaphragm 3A is suppressed.

In this embodiment, the first securing portion 52A has a first protruding piece 53A extending toward the second frame 6A from an outer edge of the first frame main body 51A, and a first pawl 54A provided in an end portion of the first protruding piece 53A.

The first protruding piece 53A is formed as being elastically deformable.

The first pawl 54A protrudes inwardly of the second frame 6A, and engages with the second frame 6A.

When the first pawl 54A engages with the second frame 6A, the elastically deformed first protruding piece 53A generates an elastomeric force, and the fitting between the first frame 5A and the second frame 6A becomes strong, therefore, the leakage of the fluid being treated from the edge portion 32A of the diaphragm 3A is further suppressed.

The second frame 6A has a second frame main body 61A opposed to the first frame 5A, and second securing portions 62A for holding the first frame 5A in a retained state.

The second concave portion 60A is formed in an inner end face of the second frame main body 61A which face is opposed to the first frame 5A.

The second securing portions 62A are provided along an outer edge of the second frame main body 61A.

When the first frame 5A and the second frame 6A are fitted with each other, by the frictional force occurring between the second securing portions 62A and the first frame 5A, the first frame 5A and the second frame 6A are fitted with each other strongly and united. Therefore, the leakage of the fluid being treated from the edge portion 32A of the diaphragm 3A is further suppressed.

In this embodiment, the second securing portion 62A has a second protruding piece 63A extending toward first frame 5A from an outer edge of the first frame main body 61A, and a second pawl 64A provided in an end portion of the second protruding piece 63A.

The second protruding piece 63A is formed as being elastically deformable.

The second pawl 64A protrudes inwardly of the first frame 5A and engages with the first frame 5A.

When the second pawl 64A engages with the first frame 5A, the elastically deformed second protruding piece 63A generates an elastomeric force, and the fitting between the first frame 5A and the second frame 6A becomes strong, therefore, the leakage of the fluid being treated from the edge portion 32A of the diaphragm 3A is further suppressed.

The first securing portions 52A and the second securing portions 62A are alternately disposed along an outer circumference of the case 2A. Thereby, it becomes possible to evenly compress the edge portion 32A of the diaphragm 3A, and the leakage of the fluid being treated from the edge portion 32A of the diaphragm 3A is further suppressed.

Further, in this embodiment, the first securing portions 52A and the second securing portions 62A are continuously provided along the outer circumference of the case 2A. Thereby, it becomes possible to evenly compress the edge portion 32A of the diaphragm 3A with sufficient strength, and the leakage of the fluid being treated from the edge portion 32A of the diaphragm 3A is further suppressed.

Between the adjacent first securing portions 52A of the first frame 5A, third concave portions 59A are formed. The third concave portion 59A is formed in a stepped shape complementary with the shape of the second protruding piece 63A and the second pawl 64A of the second frame 6A.

The third concave portions 59A are fitted with the second securing portions 62A of the second frame 6A.

By the fitting, the first frame 5A and the second frame 6A are held in a retained state. Thereby, the first frame 5A and the second frame 6A are fitted with each other and united without fastening screws and screw nuts. Therefore, it becomes possible to achieve a cost-cutting by reducing the number of parts of the securing structure 4A for the diaphragm 3A and making the assembling easy. Further, it becomes possible to make the structure of the valve device 7 simple and inexpensive.

Between the adjacent second securing portions 62A of the second frame 6A, on the other hand, fourth concave portions 69A are formed. The fourth concave portion 69A is formed in a stepped shape complementary with the shape of the first protruding piece 53A and the first pawl 54A of the first frame 5A.

The fourth concave portions 69A are fitted with the first securing portions 52A of the first frame 5A. By the fitting, the first frame 5A is held in a retained state. Thereby, the first frame 5A and the second frame 6A are fitted with each other strongly and united. Therefore, the leakage of the fluid being treated from the edge portion 32A of the diaphragm 3A is further suppressed.

The edge portion 32A of the diaphragm 3A is continuously provided with a thick part 33A whose thickness is more than the membrane portion 31A. Thereby, the first frame 5A and the second frame 6A can hold the diaphragm 3A by exerting enough pressure to the thick part 33A, while securing sufficient durability for the diaphragm 3A, and the leakage of the fluid being treated from the edge portion 32A of the diaphragm 3A is further suppressed.

The second frame 6A is provided with a groove 65A to which the thick part 33A is fitted.

While detailed description has been made of the valve device according to the present invention, the present invention can be embodied in various forms without being limited to the illustrated embodiments.

DESCRIPTION OF THE SIGNS 1 diaphragm pump
2 case
3 diaphragm
4 securing structure
5 first frame
6 second frame
7 valve device
8 driving means
20 space
21 first chest
22 second chest
32 edge portion
33 thick part
50 first concave portion
51 first frame main body
52 first securing portion
53 first protruding piece
54 first pawl
60 second concave portion
61 second frame main body
62 second securing portions
63 second protruding piece
64 second pawl
71 inflow port
72 NC outflow port
73 NO outflow port

The invention claimed is:

1. A structure for securing a diaphragm to a case comprising:
the case composed of a first frame having a first concave portion defining a first chest, and a second frame having a second concave portion defining a second chest, and
the diaphragm separating the first chest from the second chest,
wherein
the first frame comprises a first frame main body and first securing portions,
the second frame comprises a second frame main body and second securing portions,
the first securing portions extend toward the second frame and are disposed along an outer circumference of the first frame main body at intervals so as to form third concave portions therebetween, and
the second securing portions extend toward the first frame and are disposed along an outer circumference of the second frame main body at intervals so as to form fourth concave portions therebetween,
wherein
the first frame and the second frame are fitted with each other in such a fit state that the first securing portions fit into the respective third concave portions, and the second securing portions fit into the respective fourth concave portions, whereby the first securing portions and the second securing portions are alternately disposed along the outer circumference of the case,
wherein
in the fit state, first pawls protruding from the first securing portions engage with the second frame, and second pawls protruding from the second securing portions engage with the first frame, whereby the fit state is retained, and
an edge portion of the diaphragm is compressed and held between the first frame and the second frame, whereby the diaphragm is secured to the case.

2. The structure as set forth in claim 1, wherein each said first securing portion comprises
a first protruding piece being elastically deformable and extending toward the second frame from an outer edge of the first frame main body, and
the first pawl is provided in an end portion of the first protruding piece to engage with the second frame.

3. The structure as set forth in claim 2, wherein each of the second securing portions comprises
a second protruding piece being elastically deformable and extending toward the first frame from an outer edge of the second frame main body, and
the second pawl is provided in an end portion of the second protruding piece to engage with the first frame.

4. The structure as set forth in claim 1, wherein the edge portion of the diaphragm is provided with a thick part having a larger thickness than a central membrane part.

5. The structure as set forth in claim 4, wherein the first frame and/or the second frame is provided with a positioning groove at which the thick part is disposed.

6. A diaphragm pump equipped with the structure as set forth in claim 1 wherein
the first frame is provided with a first port communicating with the first chest,
the second frame is provided with a second port communicating with the second chest,
a fluid for driving the diaphragm is fed to the first chest via the first port, and
a fluid being treated flows into and flows out of the second chest via the second port.

7. A valve device equipped with the structure as set forth in claim 1 wherein
the first chest of the first frame is provided with a driving means for driving the diaphragm,
the second frame has an inflow port for flowing the fluid into the second chest, and an outflow port for flowing the fluid out of the second chest, and
the outflow port has an opening around which a valve seat is formed, and
the diaphragm sits on and leaves the valve seat to close and open the outflow port.

* * * * *